Oct. 17, 1933.  C. H. DRUDE  1,931,065
CLUTCH MEMBER
Filed April 17, 1931
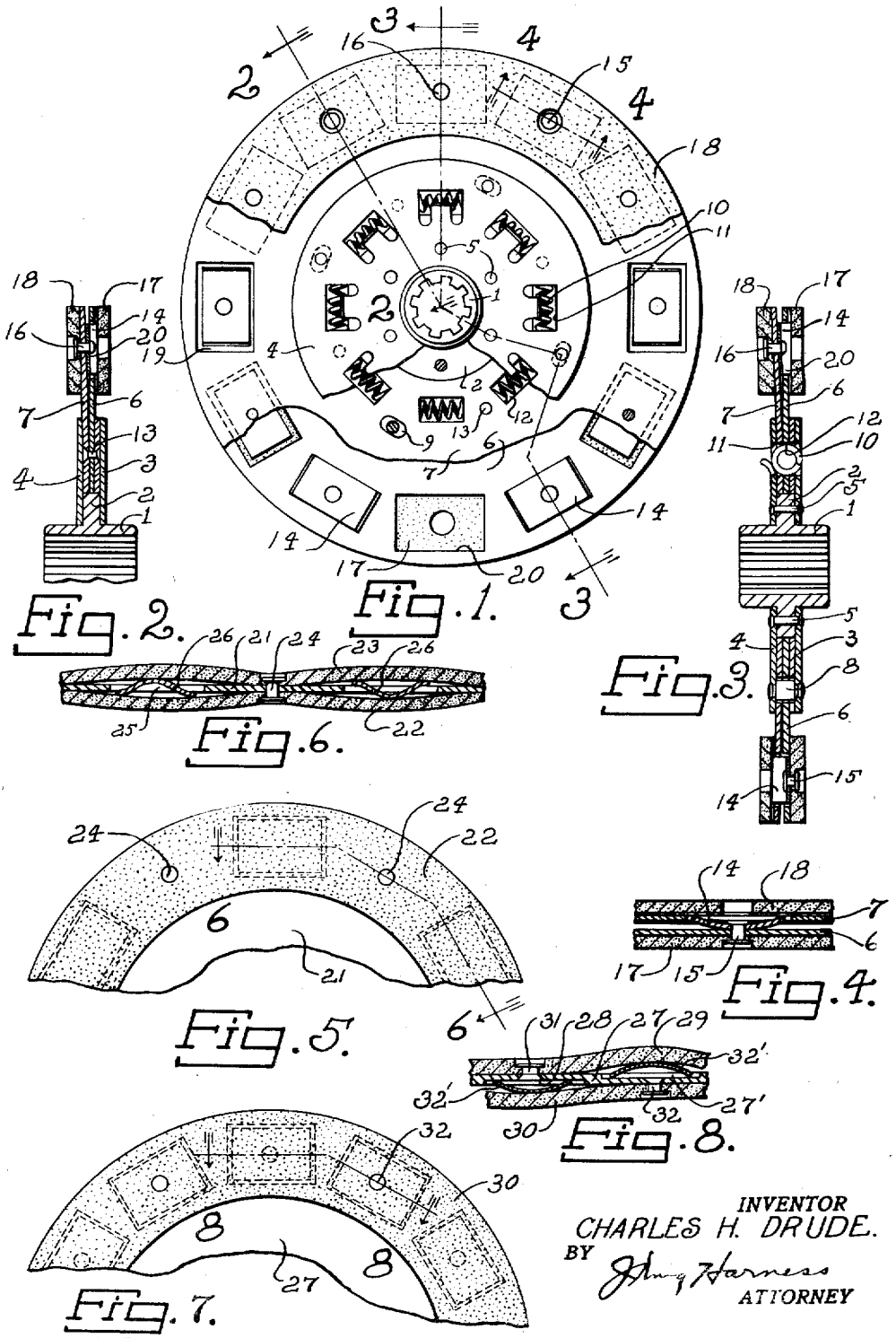
INVENTOR
CHARLES H. DRUDE.
BY Johny Harness
ATTORNEY Patented Oct. 17, 1933

1,931,065

UNITED STATES PATENT OFFICE 1,931,065

CLUTCH MEMBER

Charles H. Drude, Ferndale, Mich., assignor to Chrysler Corporation, Detroit, Mich., a corporation of Delaware Application April 17, 1931. Serial No. 530,906

19 Claims. (Cl. 192—107)

This invention relates to an improved clutch member of the frictional type.

Heretofore, clutch members of this kind have included metal discs having slightly pliable clutch lining. The lining has been riveted or rigidly attached in any suitable manner to the discs at spaced intervals and provisions has been made for yieldably urging those portions of the lining, which lie between the rivets, outwardly from the disc so as to compensate for misalignment in the faces of the clutch lining and the adjacent faces of the members with which they co-operate. When this is accomplished by merely deforming those portions of the discs which lie between adjacent rivets, or by inserting resilient elements between the lining and disc intermediate the adjacent rivets, it is impossible to compress all parts of the outwardly urged portions of the lining into alignment with the portions of the lining which are located in the region of the rivets. This condition results in the formation of protruding irregularities or humps on the face of the lining which cause the clutch members to bind and chatter during operation of the clutch and particularly during engaging and disengaging of the clutch.

The main objects of the invention are to provide an improved frictional clutch member, to provide improved means in a clutch member of this kind for yieldably urging the clutch lining as a whole toward the faces of the members with which the lining co-operates; to provide means of this kind also urges the portions of the lining which are located between the parts thereof that are fixed to the clutch member, outwardly with respect to the fixed parts of the lining; to provide means of this kind which are adapted to permit the entire frictional surface of a clutch lining ring to be held in a single plane when the clutch member is placed under compression of a degree conventionally used in clutch operations; and to provide recesses in the supporting structure of a clutch member of this kind in which the resilient members are completely receivable when the clutch member is under compression so as to obviate the formation of humps or other irregularities on the faces of the clutch lining.

Further objects of the invention are to provide means in a clutch member for urging outwardly only the portions of the lining which are located between the parts thereof that are fixed to the supporting structure of the clutch member, to provide chambers in the supporting structure of the clutch member which are of sufficient depth to accommodate the entire thickness of the resilient members when the clutch member is under compression, and to provide resilient means which bear upon the clutch lining rings of respectively opposite sides of a clutch member between their fixed portions so as to yieldably urge the unfixed portions of the lining rings outwardly in respectively opposite directions.

An illustrative embodiment of the invention is shown in the accompanying drawing, in which:

Fig. 1 is a side elevation of a clutch member which embodies my invention showing portions removed so as to disclose the under-lying structure.

Fig. 2 is a radial transverse section taken on the line 2—2 of Fig. 1.

Fig. 3 is a transverse section taken on the line 3—3 of Fig. 1.

Fig. 4 is a fragmentary transverse section taken on the line 4—4 of Fig. 1.

Fig. 5 is a fragmentary side elevation of a clutch member which embodies a modified form of the invention.

Fig. 6 is a fragmentary transverse section taken on the line 6—6 of Fig. 5.

Fig. 7 is a fragmentary elevation of a clutch member which embodies a further development of the invention.

Fig. 8 is a fragmentary transverse section taken on the line 8—8 of Fig. 7.

In the form shown in Figs. 1 to 4 inclusive, my improved clutch member which, in operation, may be employed either as a driving or driven element, includes a central hub 1 having an integral radial flange 2 intermediate its ends. Flat rings 3 and 4 are concentrically mounted on the hub, and rigidly held adjacent the respectively opposite sides of the radial flange 2 by rivets 5. These flat rings extend beyond the outer periphery of the flange 2 forming an annular groove in which a pair of adjacent discs 6 and 7 are mounted. The discs 6 and 7 are journaled on the periphery of the flange 2 and their movement relative to the hub and flat rings 3 and 4 is positively limited by rivets 8 which extend through elongated slots 9 in the discs.

The discs 6 and 7 are yieldably held against movement relative to the hub 1 by resilient coil springs 10 which are seated in registering apertures 11 and 12 in the flat rings 3 and 4 and in the discs 6 and 7, respectively. The end convolutions of the coils 10 bear against the extremities of the slots 11 and 12 and yieldably hold the discs against movement relative to the flat rings and hub 1.

The discs 6 and 7 are secured together at their central portion by rivets 13 and their outer marginal portions are spread apart by resilient elements which include bowed spring plates 14. The bowed spring plates are arranged in a circumferential series, as illustrated in Fig. 1, and alternate plates of the series are rigidly attached at their intermediate portions to the discs 6 and 7 by rivets 15 and 16, respectively. These rivets have head ends which are seated in apertures formed in frictional clutch lining rings 17 and 18 that are secured to the discs 6 and 7, respectively, at spaced intervals by the rivets 15 and 16. The bowed spring plates 14, which are carried by the disc 6, extend through openings or passages 19 in the discs 7 and bear against the lining ring 18 intermediate the portions thereof which are rigidly secured to the disc 7. The spring plates 14, which are carried by the disc 7, extend through openings 20 in the disc 6 and bear against portions of the clutch lining ring 17 which are located between the portions of the ring that are fixed to the disc 6. With this construction, the bowed spring plates spread the outer portions of the discs apart and urge those portions of the lining rings 17 and 18 which are located between the rivets that secure the rings to the discs outwardly away from the disc.

The bowed spring plates 14 are at least as thin, or slightly thinner than the thickness of the discs 6 and 7 and their curvature is such that when the clutch member is placed under compression during operation, the spring plates are completely receivable between the open sides of the passages 19 and 20. Therefore, when the clutch member is placed under compression, the spring plates 14 lie within the opposite ends of the passages 19 and 20 in the discs and permit the faces of the normally outwardly urged parts of the clutch lining rings and the faces of the fixed portions of the rings to lie in a single plane. Radical curvatures and extreme reversely bent portions are avoided in the spring plates for they present non-compressible ridges which form humps in the lining rings when the clutch member is compressed between its co-operating elements. This feature of the invention prevents binding of the clutch member and resulting chattering thereof when the elements between with which the clutch member co-operates are not in perfect alignment.

In the form shown in Figs. 5 and 6, my invention is illustrated in conjunction with a clutch member which includes a single support or disc 21 on the respectively opposite sides of which are secured clutch lining rings 22 and 23. The lining rings 22 and 23 are fixed at spaced intervals to the disc 21 by rivets 24. Formed in the disc 21, between the spaced rivets 24, are openings or passages 25 which register with the lining rings 22 and 23. A bowed spring plate 26 is disposed in each opening 25 between the lining rings 23 and 24. These bowed spring plates bear between the adjacent surfaces of the clutch lining rings 22 and 23, and yieldably urge the portions thereof which are located between adjacent rivets 24, outwardly in respectively opposite directions. The bowed spring plates 26 are at least as thin, or slightly thinner than the thickness of the disc 21 and their curvature is such that when the clutch member is placed under compression during operation, all portions of the spring plates lie entirely within the respectively opposite open ends of the passages 25 so as to permit the normally outwardly bulged portions of the clutch lining rings to be pressed against the respectively opposite side faces of the disc without forming humps or other irregularities on the external frictional faces of the lining rings.

In the form of the invention illustrated in Figs. 7 and 8, the clutch member includes a single disc 27 in the respectively opposite side faces of which are formed circular pairs of staggered recesses 27' and 28. These recesses are located at the outer marginal portion of the disc 27 and they are covered by frictional clutch lining rings 29 and 30 which are fixed at spaced intervals to the respectively opposite side faces of the disc 27 by rivets 31 and 32. The rivets 31 extend through apertures in the bottom wall of the recesses 28 and the rivets 32 extend through apertures in the bottom wall of the recesses 27'. In this manner, the lining ring of each side of the disc 27 is fixed to the latter on respectively opposite ends of the adjacent recesses.

Disposed in the recesses 27' and 28 of the respectively opposite sides of the disc 27 are bowed spring plates 32' which bear between the floor of the recesses and the adjacent surfaces of the clutch lining rings 29 and 30 at a point substantially midway between the fixed portions of the rings. The spring plates 32' yieldably urge the unfixed portions of the clutch lining rings outwardly with respect to the support 27, as shown in Fig. 8. These spring plates are equal in thickness to, or slightly thinner than the depth of the recesses and they are completely receivable in the recesses when the clutch member is placed under compression during operation. The normally outwardly urged portions of the rings may be forced into alignment with the fixed portions thereof without forming humps or other irregularities on the frictional face of the rings.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. A clutch member including a support having circumferentially spaced recesses therein provided with side and end walls, a clutch lining ring extending over said recesses and fixed to said support intermediate said recesses, and a bowed spring plate in each recess for yieldably urging said lining ring outwardly intermediate the fixed portions thereof, said spring plates having side and end edges engageable with said side and end walls respectively for limiting displacement of said spring plates.

2. A clutch member including a hub, a pair of superimposed yieldable discs fixed on said hub at their central portions, clutch lining rings on the outer faces of said discs, and resilient means between said discs each bearing between a disc and a clutch lining ring of the opposite disc for yieldably urging the outer portions thereof and said lining rings apart.

3. A clutch member including a hub, a pair of adjacent supporting elements fixed at their central portions on said hub, one of said elements having an opening therein, a clutch lining member secured to the outer face of the latter supporting element and extending over said opening, and a resilient member in said opening bearing between said clutch lining member and the other supporting element for urging portions of said lining outwardly from the supporting element upon which it is secured and urging said supporting elements apart.

4. A clutch member including a hub, a pair of yieldable discs mounted at their central portions on said hub, one having a passage therethrough, a clutch lining member fixed to the outer face of the latter disc at spaced locations and extending over said passage, and a bowed spring plate secured to one of said discs and extending through the aperture of the other disc for yieldably holding said discs apart and urging said lining outwardly from the disc upon which it is mounted.

5. A clutch member including a hub, a pair of yieldable discs mounted at their central portions on said hub; one having a passage therethrough, a clutch lining member fixed to the outer face of the latter disc at spaced locations and extending over said passage, a resilient member secured to one of said discs and extending through the passage of the other disc for yieldably holding said discs apart and urging said lining outwardly from the disc upon which it is mounted, said resilient member being completely receivable between the open ends of said passage for permitting the face of the outwardly urged portion of said lining to lie in the plane of the face of the fixed portions thereof when said clutch member is under compression.

6. A clutch member including a hub, a pair of discs mounted at their central portions on said hub and having staggered passages therethrough, a pair of clutch lining rings, one fixed to each disc and extending over the passages thereof respectively, and a resilient member in each passage of both discs for yieldably urging staggered portions of said lining rings outwardly.

7. A clutch member including a pair of resilient discs having staggered openings therein, means securing the central portions of said discs together, clutch lining fixed on each of said discs and extending over the openings therein, and resilient members secured on said discs, each bearing between one of said discs and the clutch lining of the other disc for spreading the outer portions of said discs apart.

8. A clutch member including a pair of resilient discs having staggered openings therein, means securing the central portions of said discs together, clutch lining on the outer faces of each of said discs respectively, extending over the openings thereof and fixed to said discs on opposite sides of said openings, and a resilient member in each of said openings, each bearing between one disc and the clutch lining of the other disc for simultaneously spreading said discs apart and urging the unfixed portions of said clutch lining outwardly from the respective discs.

9. A clutch member including a pair of resilient discs having staggered openings therein, means securing the central portions of said discs together, clutch lining fixed on each of said discs and extending over the openings therein, and resilient members secured on said discs and extending into said openings, each bearing between one of said discs and the clutch lining of the other disc for spreading the outer portions of said discs apart, said resilient member being at least as thin as the thickness of said discs and completely receivable in said openings when said clutch member is under compression.

10. A clutch member including a support having recesses in its opposite side faces provided with side and end walls, clutch lining fixed on said opposite side faces and extending over said recesses, and a resilient member entirely receivable in each of said recesses and normally having a protruding portion urging portions of said lining outwardly with respect to said support circumferential displacement of said resilient means being limited by the end walls of said recesses.

11. A clutch member including a support having staggered recesses in its respectively opposite side faces, clutch lining on said side faces extending over said recesses, and a resilient member in each of said recesses bearing between said support and said clutch lining for urging staggered portions of the lining of respectively opposite sides of said support outwardly from the latter.

12. A clutch member including a support having recesses in its opposite side faces provided with side and end walls, clutch lining fixed on said opposite side faces and extending over said recesses, and a resilient freely disposed in each of said recesses normally urging portions of said lining outwardly with respect to said support and having side and end edge portions engageable with said side and end walls respectively for limiting displacement of said resilient member, said resilient members being at least as thin as the depth of said recesses and being completely receivable therein when said clutch member is under compression.

13. A clutch member including a support having staggered recesses in its respectively opposite side faces, a pair of clutch lining rings, one adjacent each opposite side of said support and extending over said recesses, means rigidly fixing said rings to said support at alternate recesses thereof, and a bowed spring plate in each of said recess for yieldably urging the portions of said lining rings between the fixed parts thereof outwardly from said support.

14. A clutch member including a support having circumferentially spaced openings therein, a pair of clutch lining rings, one on each side of said support extending over said openings, and resilient members in said openings bearing between the clutch lining rings of respectively opposite sides of said support.

15. A clutch member including a support having circumferentially spaced openings therein, a pair of clutch lining rings, one on each side of said support extending over said openings, and a bowed spring plate in said openings for bearing between registering parts of said lining rings urging opposite portions of said rings outwardly from said support, said plates being at least as thin as the thickness of said support and being completely receivable in said openings when said clutch member is under compression.

16. A clutch member including a support having circumferentially spaced openings therein, a pair of clutch lining rings, one on each side of said support extending over said openings, rivets extending through said support and said rings intermediate adjacent openings, and resilient members located in said openings and bearing between said lining rings for urging the portions of said rings between said rivets outwardly.

17. A clutch member comprising a disk having a series of openings around the same, facings riveted at intervals to opposite sides of the disk between said openings, and a flat bowed spring confined in said openings between the facings, each spring being separate from the disk and having oppositely bowed portions pressing both facings outwardly from the disk.

18. A clutch member comprising a disc and a facing secured thereto, the facing having a plurality of air holes extending through the same, and bowed springs carried by the disc behind said holes.

19. A clutch member including a support having a recess therein provided with side and end walls, a clutch lining member on said support extending over said recess, and a resilient member in said recess for urging said lining outwardly from said support and adapted to be substantially completely received within said recess when said clutch member is under compression, said resilient member having side and end edges engageable with said side and end walls respectively for limiting displacement of said resilient member.

CHARLES H. DRUDE.

CERTIFICATE OF CORRECTION.

Patent No. 1,931,065.　　　　　　　　　　　　October 17, 1933.

CHARLES H. DRUDE.

It is hereby certified that error appears in the printed specification of the above numbered patent requiring correction as follows: Page 1, line 32, after "kind" insert which; page 3, line 93, claim 12, after "resilient" insert member; and that the said Letters Patent should be read with these corrections therein that the same may conform to the record of the case in the Patent Office.

Signed and sealed this 20th day of March, A. D. 1934.

F. M. Hopkins (Seal)　　　　　　　　　　　　Acting Commissioner of Patents.

and bowed springs carried by the disc behind said holes.

19. A clutch member including a support having a recess therein provided with side and end walls, a clutch lining member on said support extending over said recess, and a resilient member in said recess for urging said lining outwardly from said support and adapted to be substantially completely received within said recess when said clutch member is under compression, said resilient member having side and end edges engageable with said side and end walls respectively for limiting displacement of said resilient member.

CHARLES H. DRUDE.

CERTIFICATE OF CORRECTION.

Patent No. 1,931,065.      October 17, 1933.

CHARLES H. DRUDE.

It is hereby certified that error appears in the printed specification of the above numbered patent requiring correction as follows: Page 1, line 32, after "kind" insert which; page 3, line 93, claim 12, after "resilient" insert member; and that the said Letters Patent should be read with these corrections therein that the same may conform to the record of the case in the Patent Office.

Signed and sealed this 20th day of March, A. D. 1934.

F. M. Hopkins (Seal)      Acting Commissioner of Patents.

CERTIFICATE OF CORRECTION.

Patent No. 1,931,065.  October 17, 1933.

CHARLES H. DRUDE.

It is hereby certified that error appears in the printed specification of the above numbered patent requiring correction as follows: Page 1, line 32, after "kind" insert which; page 3, line 93, claim 12, after "resilient" insert member; and that the said Letters Patent should be read with these corrections therein that the same may conform to the record of the case in the Patent Office.

Signed and sealed this 20th day of March, A. D. 1934.

F. M. Hopkins (Seal)  Acting Commissioner of Patents.